United States Patent
Nurse, Jr. et al.

(10) Patent No.: US 6,890,433 B2
(45) Date of Patent: May 10, 2005

(54) SYSTEM FOR TREATING WASTEWATER

(75) Inventors: Harry L. Nurse, Jr., 12207 Plantation Blvd., Goshen, KY (US) 40026; Theophilus B. Terry, III, Hodgenville, KY (US)

(73) Assignee: Harry L. Nurse, Jr., Goshen, KY (US)

( * ) Notice: Subject to any disclaimer, the term of this patent is extended or adjusted under 35 U.S.C. 154(b) by 37 days.

(21) Appl. No.: 10/379,037

(22) Filed: Mar. 4, 2003

(65) Prior Publication Data

US 2004/0099588 A1 May 27, 2004

Related U.S. Application Data

(63) Continuation-in-part of application No. 09/834,318, filed on Apr. 13, 2001, now Pat. No. 6,592,755.

(51) Int. Cl.[7] .......................... B01D 15/00; B01D 12/00
(52) U.S. Cl. .................... 210/263; 210/532.2; 210/456; 210/472
(58) Field of Search .............................. 210/263, 532.2, 210/456, 472

(56) References Cited

U.S. PATENT DOCUMENTS

| | | | |
|---|---|---|---|
| 3,662,918 A | 5/1972 | Crawford et al. |
| 3,767,051 A | 10/1973 | Thompson |
| D229,053 S | 11/1973 | LeBlanc |
| 3,859,214 A | 1/1975 | Lang et al. |
| 4,325,823 A | 4/1982 | Graham |
| 4,363,732 A | 12/1982 | Crates et al. |
| 4,961,670 A | 10/1990 | McKenzie et al. |
| 5,217,616 A | 6/1993 | Sanyal et al. |
| 5,318,699 A | 6/1994 | Robertson et al. |
| D357,530 S | 4/1995 | Grenier et al. |
| 5,645,732 A | 7/1997 | Daniels |
| 5,707,513 A | 1/1998 | Jowett et al. |
| 5,762,793 A | 6/1998 | Nurse, Jr. |
| 5,980,739 A | 11/1999 | Jowett et al. |
| 6,099,722 A | 8/2000 | Tittlebaum et al. |
| 6,153,094 A | 11/2000 | Jowett et al. |
| 6,171,507 B1 | 1/2001 | Roy et al. |
| 6,190,548 B1 | 2/2001 | Frick |
| 6,267,882 B1 | 7/2001 | Houck et al. |
| 6,280,614 B1 | 8/2001 | Berg et al. |
| 6,328,890 B1 | 12/2001 | Thibault |

*Primary Examiner*—Chester T. Barry
(74) *Attorney, Agent, or Firm*—Charles G. Lemb; Middleton Reutlinger

(57) ABSTRACT

A wastewater treatment system includes a septic tank having a discharge in flow communication with one or more biofilter containers having filter media therein. Wastewater or effluent from the septic tank is allowed to trickle downwardly through the filter media and each container includes an outlet for discharging the wastewater to the environment or transferred to other treatment facilities.

47 Claims, 7 Drawing Sheets

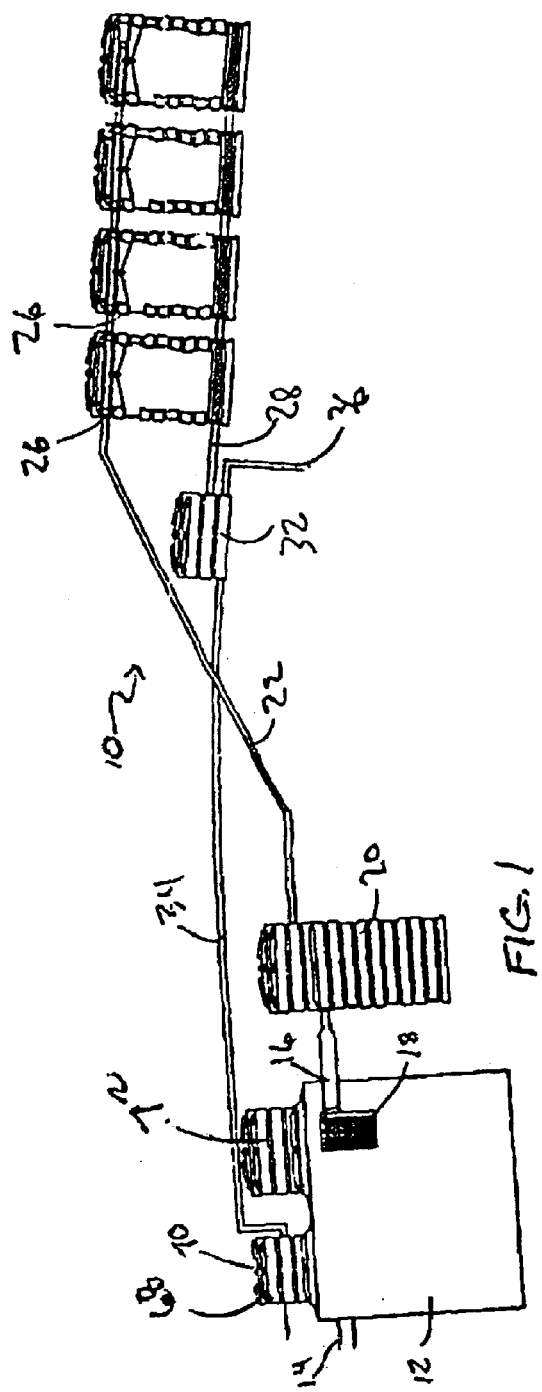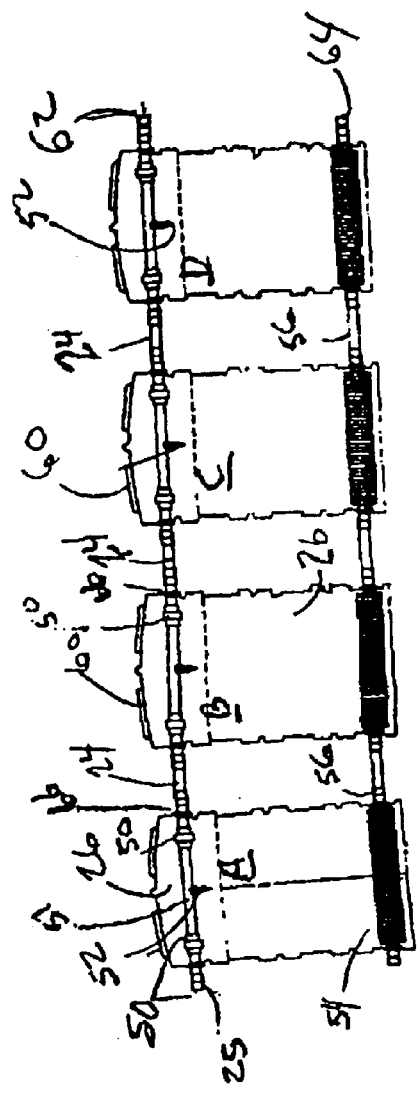

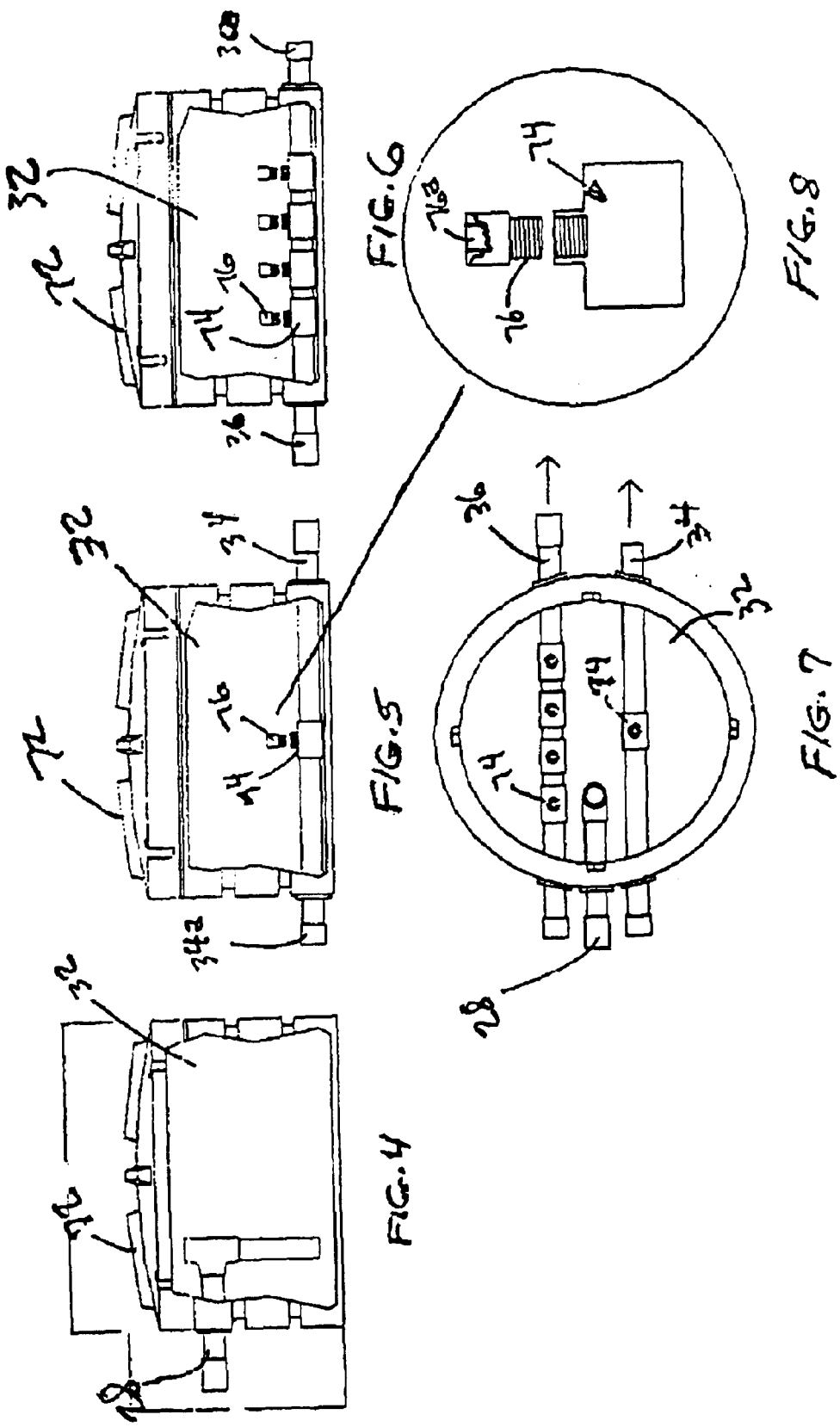

SYSTEM FOR TREATING WASTEWATER

CROSS-REFERENCE TO PRIOR APPLICATIONS

This application is a Continuation-in-Part of U.S. patent application Ser. No. 09/834,318, filed Apr. 13, 2001, now U.S. Pat. No. 6,592,755, which is incorporated herein by reference.

BACKGROUND OF THE INVENTION

This invention relates to a system for treating wastewater and more particularly for the treatment of wastewater including the use of filtering materials as aerobic biofilters in a biofilter treatment tank.

In the treatment of wastewater, such as sewage and the like, it is common to provide a septic tank with an inlet in an upper portion to receive the wastewater. The septic tank is provided with, and generally on the opposite side from the inlet, an outlet discharge which is in flow communication with laterals for discharging effluent into an open field or the like. In the septic tank, the particulate materials settle to the bottom and it is the effluent which is removed through the laterals. Moreover, it has become common practice to install filters at the outlet discharge from the septic tank to remove undissolved solid particulate materials thereby preventing said materials from entering into the lateral field.

In recent years, it has been suggested to even further treat effluent from a septic tank before the wastewater is left to the environment. For example, U.S. Pat. No. 5,980,739 to Jowett et al teaches a wastewater treatment system including an aerobic filter medium, particularly polyurethane foam particles and the like, as a biofilter. Also, U.S. Pat. No. 5,762,784 also to Jowett et al teaches a water treatment apparatus which includes a container having apertures through the walls thereof and being opened to the atmosphere filled with open celled foam material for use in the treatment of wastewater.

SUMMARY OF THE INVENTION

It is an object of the present invention to provide a wastewater treatment system to treat organic matter, solids, and pathogens.

It is also an object of the present invention to provide a wastewater treatment system for treatment of organic matter, solids, and pathogens which is relatively inexpensive and easy to install and maintain.

More particularly, the present invention is directed to a method for treating wastewater wherein water received within a septic tank is either pumped or gravity fed to a container having a body of filter material therein wherein the wastewater is generally sprayed along the top of the body of filter material and is allowed to percolate slowly downwardly therethrough. The filtered wastewater is collected in the bottom of the container and then transferred by pump or gravity into laterals, or the like, or to other parts of the environment, or is recycled for further treatment.

Even more particularly, the present invention is directed to a wastewater treatment system which includes a septic tank in flow communication with at least one container having a body of filter material therein. An inlet to the container is in flow communication with an outlet from the septic tank. The inlet to the container includes spray nozzles to spray effluent over the body of filter material into the at least one container, the inlet including a conduit extending along the upper portion of the container. The filter material is preferably open-cell foam material in randomly stacked cubes within the container which provides for a filter medium having large openings or spaces therein so that the growth of biomatter does not plug nor unduly interfere with the filtration of the wastewater as it descends or percolates downwardly therethrough. Moreover, the container is a solid wall container with a lid loosely placed thereon or includes an opening in the lid so that there is an adequate supply of oxygen into the container to assist in the degradation of the organic matter and pathogens therein. The system may also include a recycle tank having an inlet in flow communication with the outlet from at least one container wherein the recycle tank includes two outlet conduits, one in flow communication with the septic tank and the other in flow communication with the environment or is transferred for further treatment.

A better understanding of the invention may be obtained by consideration of the drawings and the detail of a preferred embodiment set forth hereinafter.

BRIEF DESCRIPTION OF THE DRAWINGS

FIG. 1 is a generally schematic view of one preferred wastewater system of the present invention;

FIG. 2 is an enlarged side sectional view of a plurality of containers, including the filter medium of the present invention;

FIG. 4 is a first side view, with selected portions cut-away, of a recirculating tank of the present invention;

FIG. 5 is a second side view, with selected portions cut-away, of the recirculating tank of FIG. 4;

FIG. 6 is a third side view, with selected portions cut-away, of the recirculating tank of FIG. 4;

FIG. 7 is a top view of the recirculating tank of FIG. 4;

FIG. 8 is an enlarged side view, with selected portions cut-away, of the inverted "T" connections in the outlet conduits in the recirculating tank of FIG. 4;

DETAILED DESCRIPTION OF THE PREFERRED EMBODIMENT

Figure 3:
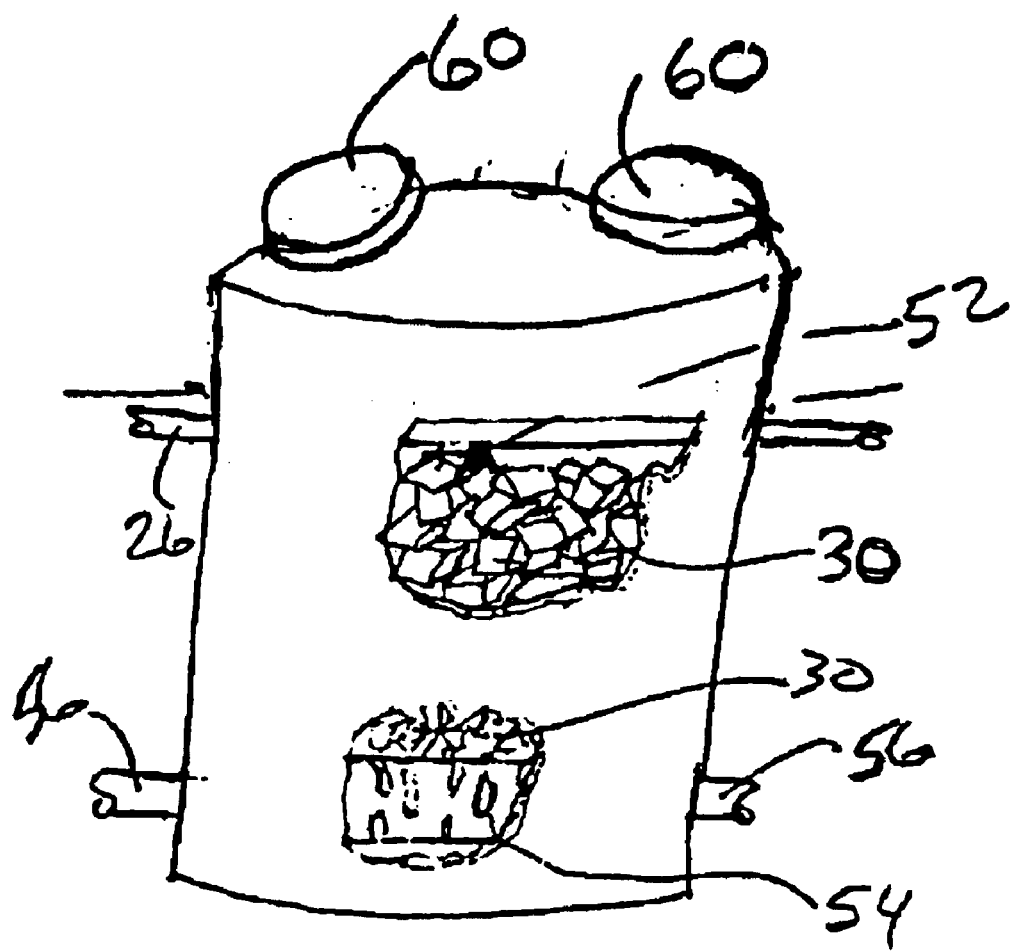
FIG. 3 is an enlarged perspective view, with selected portions cut away, of a preferred container with filter medium therein of the present invention.

As best shown in FIG. 1, a wastewater treatment system of the present invention includes septic tank 12 which receives wastewater effluent, including organic matter, pathogens, and other particulates. An inlet 14 is provided for receiving the wastewater into the septic tank 12 and an outlet 16 is provided for the discharge of wastewater therefrom. Tanks 12 are generally provided with a filter 18 attached to outlet 16 which removes most of the particulates from the wastewater that have not settled out or have broken down from the anaerobic activity occurring within the tank 12. The filter 18 may be any well known filter which is commercially available, such as the Zabel Industries's A1800 filter. The effluent, by gravity, flows from the tank 12 through the outlet 16 into a transfer or holding tank 20. Tank 20 generally includes a pump, not shown, for pumping the effluent into a plurality of biotreatment containers 26 by way of conduit 22. It is realized that the effluent may be transferred from tank 20 to containers 26 by other means such as gravity, if appropriate.

Figure 9:
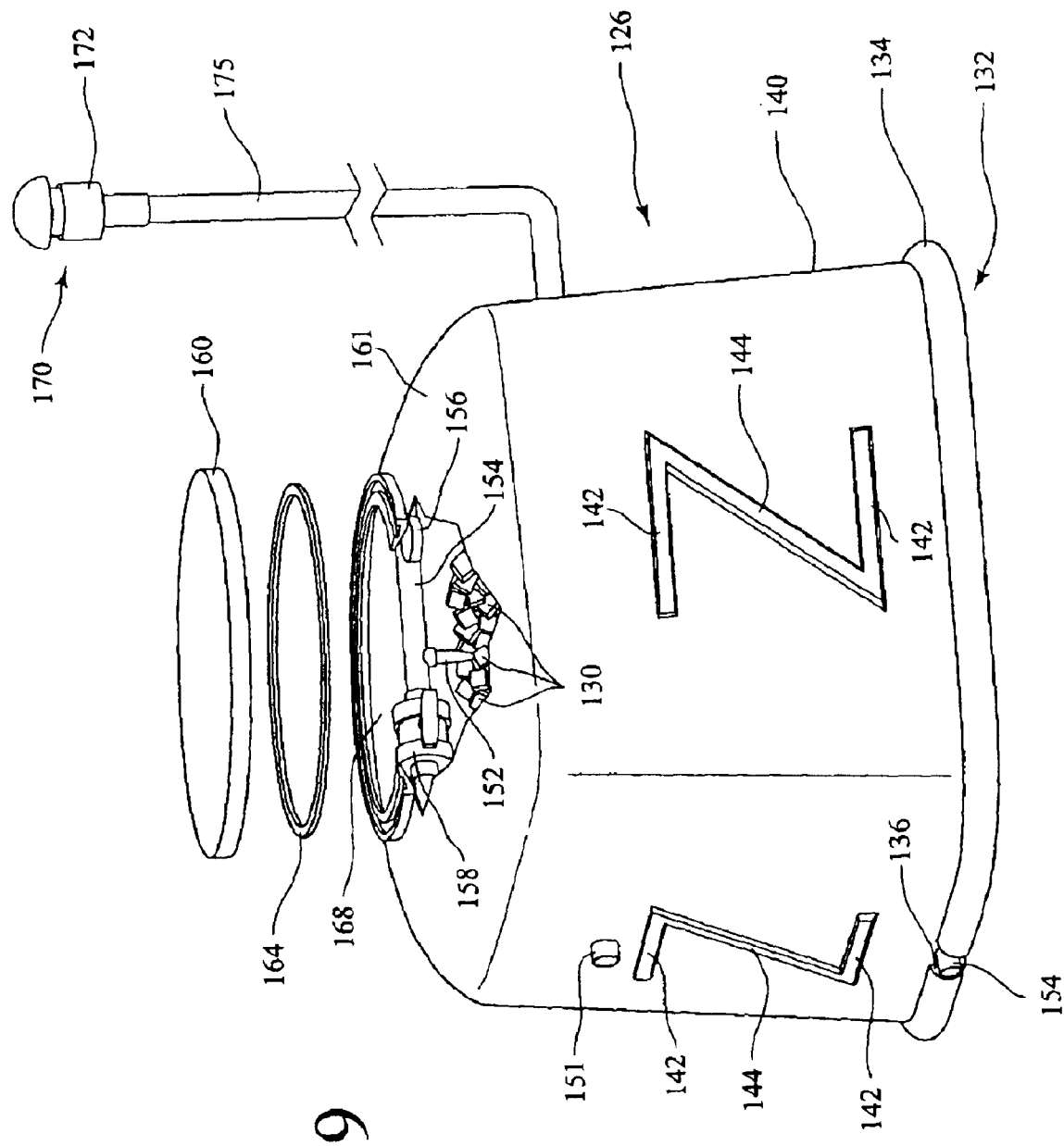
FIG. 9 is a perspective view of one embodiment of a container of the present invention with a cut away of the wall showing the filter medium.
Figure 10:
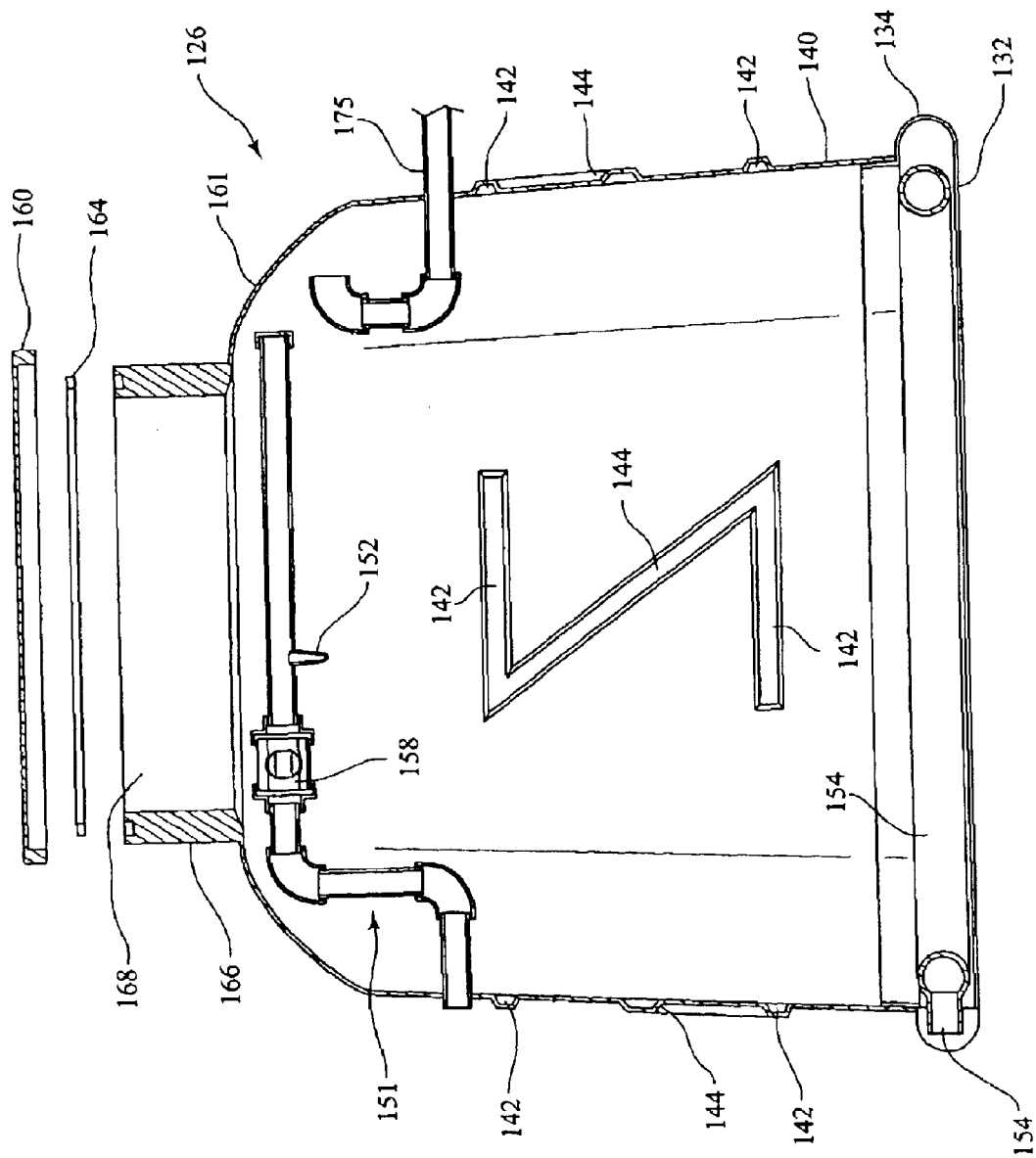
FIG. 10 is a side sectional view of another embodiment of a container of the present invention showing the internal plumbing.

As best shown in FIG. 2, the biotreatment containers 26 can be connected in series wherein effluent pumped from effluent transfer tank 20 enters the biotreatment containers 26 through an inlet pipe 25 into a first biotreatment container 26 identified by the letter A. As shown in FIG. 2, there are four containers 26 and each container is identified by the letters A, B, C, and D, with a coupling 24 disposed there between with appropriate fittings, such as quick disconnects 50 and grommets 66 for quick connection and disconnection between the containers. However, other connections may be utilized in connecting the inlet effluent piping into the containers. Generally, the containers 26 are 55 gallon solid wall polyethylene drums which are relatively inexpensive and easily obtainable commercially and require a relatively small space. Each of the containers 26 is provided with at least one lid 60 to cover an access opening, generally an interlocking lid, and in many instances, two lids 60 are utilized for each container 26. In use, lids 60 generally are not sealed or tightened. As shown in FIG. 9 if the lids 160 are sealed, the seal may include a gasket seal 164 that fits between the lid 160 and the lip of the access opening, providing a tight seal. If the lid 160 is sealed to the container 126, then the lid can include air flow-through openings therein as a small portion of air is desired within the container to assist in the aerobic degradation of organic matter and pathogens in the effluent. If the lid 160 is not vented, or in addition to the vented lid 160, the container may be provided with a separate vent 170 as shown in FIG. 9. The vent 170 may extend from piping 175 originating within the interior space of the container 126 up to and out of the ground so that the vent 170 is in contact with fresh air. The vent 170 removes noxious gases from the interior space of the container 126 and also provides fresh oxygenated air from the outside environment to the interior space. This helps provide an environment conducive to aerobic treatment of the wastewater trickling over the filter media 130. Since the vent 170 is removing noxious gases, it may be desirable to provide a filter 172, such as a charcoal filter, on the vent so that some or all of the noxious particles are scrubbed from the air leaving the container 126. In addition, as shown in FIG. 10, the top wall 161 may have a riser 166 extending upward from the top wall 161 and terminating with the access opening 168 so that the container 126 can be buried deeper in the soil, if desired.

Figure 11:
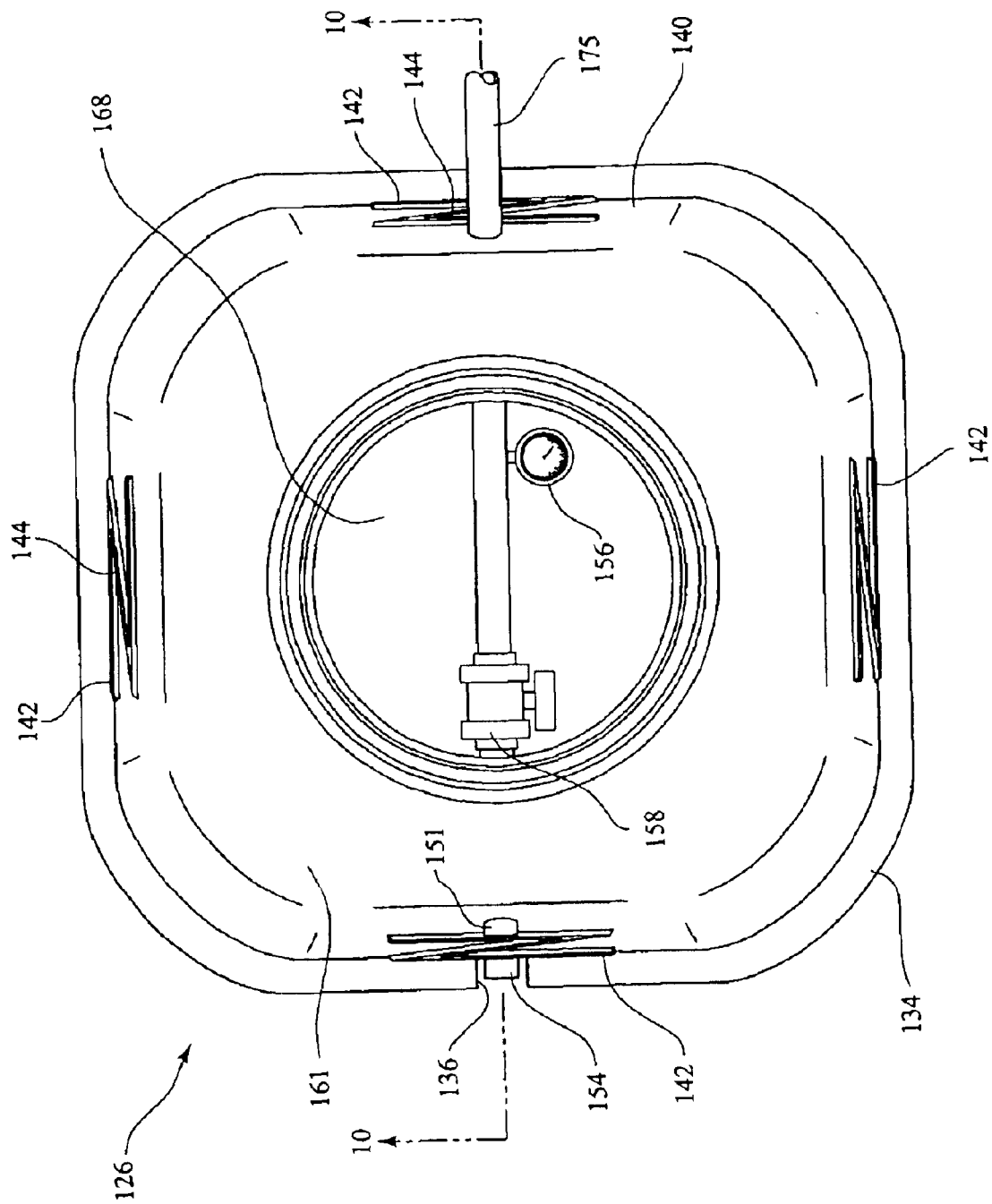
FIG. 11 is a top view of one embodiment of a container of the present invention with the lid open.

In an alternative embodiment, the biofilter containers 26 can either be connected in a series or connected to the system as individual units. The containers in an alternative embodiment can be designed specifically for use as biofilter containers. For example, as shown in FIGS. 9, 10 and 11 the biofilter container 126 can incorporate several unique features that provide added advantages over generic drums. Biofilter container 126 is comprised of a base 132 having one or more side walls 140 extending upward from the base and connecting to a top wall 161. Together, the base 132, the side walls 140 and the top wall 161 define an interior space, as in container 26, for containing a body of filter media 130. However, in addition, and unlike container 26, the base 132 can be designed to have a larger diameter than the diameter of the top wall 161. This provides a two-fold advantage. First, a smaller top wall 161 diameter results in a smaller surface footprint when the container is buried. Second, a broader base 132 diameter results in side walls 140 that slope inward as they extend upward to top wall 161. Thus, after the tank is buried, the broader base 132 and insloping side walls 140 act as an anchor and anti-flotation device that prevents the container 126 from floating upward from its originally placed location. For ease of manufacture, the base 132 can be produced separately from the top wall 161 and side walls 140. The two components can then be combined together with a water-tight seal to produce the complete biofilter container 126.

The container 126 can also have an anti-flotation ring 134 that extends outward from a peripheral edge of base 132. The anti-flotation ring also acts as an anchor or ledge that helps prevent the container 126 from floating upward from its desired location. A further anti-flotation aid can include one or more external horizontal ribs 142 projecting outward from one or more side walls 140. The external horizontal ribs 142 anchor the container 126 and prevent it from floating upward in the soil in a manner similar to that of anti-flotation ring 134. In addition, external horizontal ribs 142 provide extra structural strength to the side walls 140. Further side wall 140 strength can be added to the container 126 by the incorporation of one or more external cross container ribs 144, raised from the side walls 140 and positioned at an angle more than 0 degrees and less than or equal to 180 degrees to external horizontal ribs 144. External horizontal ribs 142 and external cross container ribs 144 can form a connected pattern, such as a "Z" as shown in FIG. 9, or may be separated from each other and still perform the desired functions.

Figure 12:
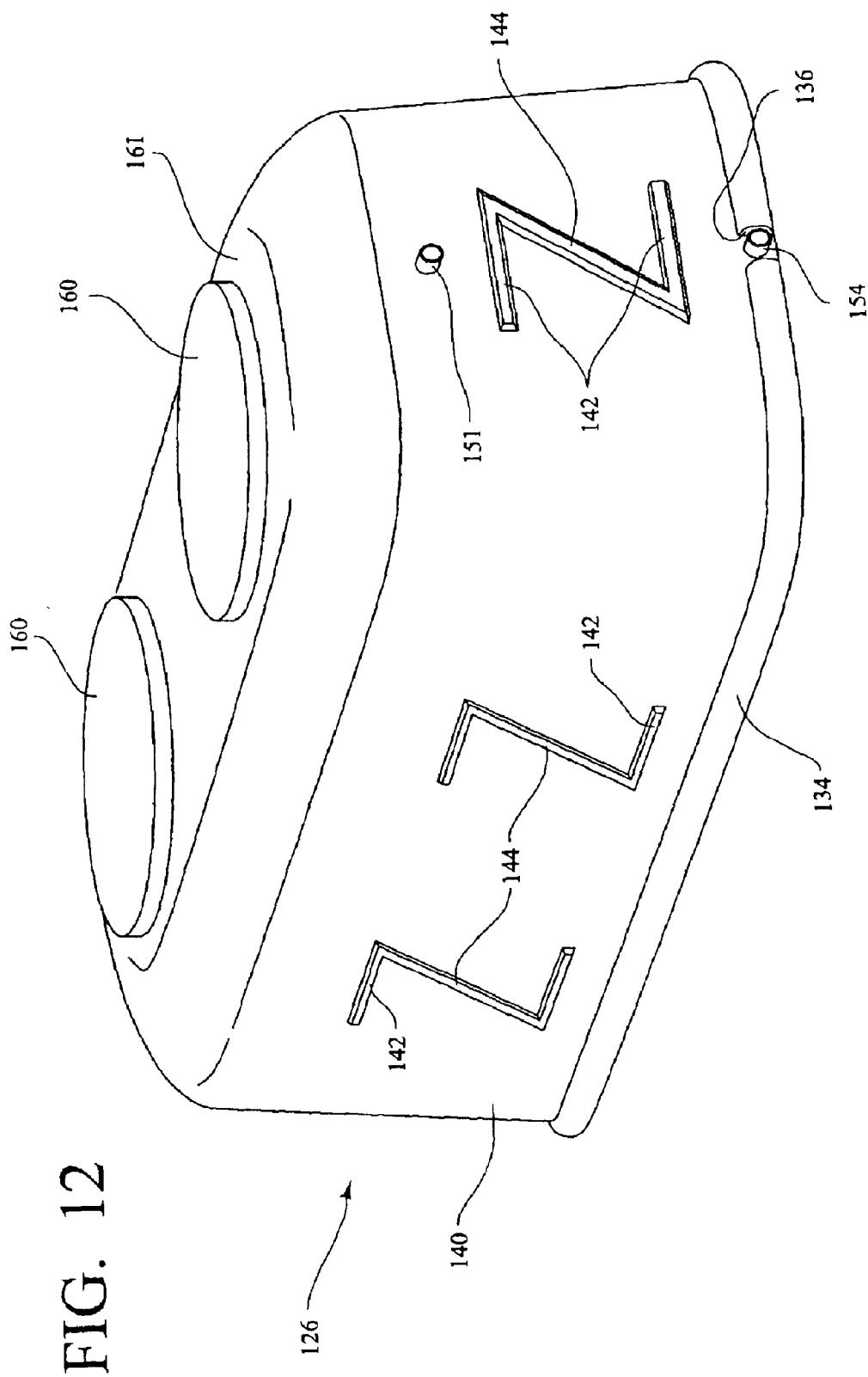
FIG. 12 is a perspective view of another embodiment of a container of the present invention having two access openings.

The biofilter container 126 can be manufactured in a wide variety of shape configurations and volumes depending on the amount of wastewater to be filtered and the terrain into which the container 126 is placed. For example, it may have an internal volume that permits it to process between about 200 gallons per day up to about 1050 gallons per day per container. The configuration, for example, may be nearly conical with a single access opening as shown in FIG. 10, or it may have more of a rectangular configuration with two access openings, as shown in FIG. 12.

The containers 26, as best shown in FIG. 3 in a preferred embodiment include 2"×2"×2" polyurethane foam cubes or blocks as a filter media or material for the effluent. Other filter media, such as organic peat or coconut coir may be used. Additionally, inorganic materials, such as sand or gravel may also be used. The filter media may optionally be contained within a filter media containment bag (not shown). This allows for easy removal of the entire body of filter media when required for cleaning or replacing.

Within each container 26 and disposed between the quick disconnects 50 is a conduit 51 with a spray nozzle 52 therein. A preferred spray nozzle 52 is a BETE spray nozzle and a preferred sizing of the piping for the 55 gallon containers 26 is 1.25" schedule 40 PVC conduits. The containers 26 can be connected in series and on the end of the coupling extending beyond the last container 26, identified by the letter D, is a plug or cap 62. As shown in FIG. 10, the inlet conduit 151 may also include a pressure regulator 158 and a gauge 156 for measuring pressure, along with a spray nozzle 152. The entire inlet conduit 151, including associated spray nozzle 152, pressure regulator 158 and gauge 156 can be pre-plumbed into the container 126 at the time of manufacture to make installation less difficult for the end user.

Disposed along the bottom of the containers 26 is a discharge conduit piping arrangement which includes a plurality of couplings 56 disposed between each of the containers 26 and is connected to perforated pipes 54 which are disposed along the bottom of the biotreatment containers 26. Preferably the couplings will be of 1.25" schedule 40 PVC and the perforated pipes 54 which are attached to the couplings 56 generally have a diameter of approximately 4" so as to provide a sufficient receiver for the effluent as it trickles down through the biotreatment cubes 30. In another embodiment, the outlet conduit 154 can exit the container 126 at anti-flotation ring 134. As shown in FIG. 11, the anti-flotation ring can have a recessed area 136 surrounding outlet conduit 154 so that if outlet conduit 154 is pre-plumbed, the end of outlet conduit 154 will be protected during shipping.

Referring back to FIG. 1, disposed between the biotreatment container 26 "A" and recirculating tank 32, is the discharge conduit 28. The recirculating tank 32 receives the biotreated wastewater from the containers 26 and is provided with two outlets, one outlet being a recirculating line 34 which recirculates a preselected amount of effluent to the septic tank 12 for further treatment and another outlet being a discharge conduit 36 which provides the means for the transfer of effluent for either further treatment or to laterals in an open field. The recirculating line 34 is in flow communication with the inlet into a riser 68 having a lower portion open into the septic tank 12. The riser 68 generally extends upward from the septic tank 12 and is provided with a cover 70 at approximately ground level. The septic tank 12 is also provided with an inlet manhole opening 72 which is disposed directly above the filter 18 for easy access into the septic tank 12 and removal or installation of filter 18.

As shown in FIGS. 4–8, a preselected recirculating tank 32 is provided with an inlet 28 which enters the recirculating tank 32 in an upper portion of the tank and the outlets 34 and 36 are provided with a plurality of inverted T-connections 74 therein with an adjustable vertically extending conduit portion 76 having a fluid inlet through-bore 76a. Vertical positioning of inlet 76a determines the quantity of wastewater that will be sent to a lateral for further treatment through line 36 or recirculates back to the septic tank 12 through line 34. As shown, the outlet 34 is provided with one T-connection 74 and the outlet 36 is provided with four T-connections 74. Thus, when the conduit portions 76 are threadably received within the body of the T-connections 74 and adjusted so the inlets 76a are at the same height as the top of the other inlets 76a, in the lines 34 and 36, then each T-connection handles the same amount of flow as the remaining T-connections. Thus, in the described embodiment, 20% of the wastewater will be discharged through line 34 and 80% of the wastewater will be discharged through line 36.

In operation, wastewater discharge enters the septic tank 12 through the wastewater inlet 14 wherein the wastewater is subjected to an anaerobic treatment within the tank 12 and also the solids within the wastewater are given an opportunity to settle to the bottom of the tank 12. The effluent, by gravity, then flows through the filter 18, out through the discharge 16 and into the transfer tank 20. The anaerobically treated effluent is then pumped through conduit 22 into one or more biotreatment containers 26 wherein the wastewater is then sprayed through nozzles 52 onto the foam cubes 30 or other filter media thereby allowing the wastewater to percolate slowly downwardly through the filter media thereby allowing for anaerobic microbiological activity to take place within the container. Generally, the lids on the container are not sealed, or other air flow inlets are provided to allow a sufficient amount of air to enter the container to provide the oxygen necessary for the aerobic treatment as the wastewater percolates downwardly therethrough. Aerobically treated wastewater collects at the bottom of the container and then, by gravity, flows outwardly through outlet conduit 28 to the recirculating tank 32 wherein a preselected amount of treated effluent is returned to the tank 12 and the remainder is discharged into laterals or for other treatment.

It will be realized that various changes may be made to the specific embodiment shown and described without departing from the principals and spirit of the present invention.

What is claimed is:

1. A biofilter container for treatment of wastewater, comprising:
    a base, a top wall having at least one opening therein and at least one side wall joining said base and said top wall, said base, said top wall and said at least one side wall defining an interior space within said container;
    a body of filter media within said interior space;
    said base having an anti-flotation ring extending outward from a peripheral edge of said base;
    said top wall having an access opening therein;
    an inlet conduit in an upper portion of said at least one side wall, said inlet conduit directing wastewater into said container and said inlet conduit having a discharge opening therein positioned downwardly into said container; and
    an outlet conduit in a lower portion of said interior space and extending through said at least one side wall, said outlet conduit having a plurality of openings therein to receive filtered wastewater and discharge from said container.

2. The biofilter container of claim 1, further comprising a lid secured over said access opening.

3. The biofilter container of claim 2, said lid having air flow-through openings to provide air circulation through said interior space.

4. The biofilter container of claim 2, further comprising a gasket seal positioned between said lid and a rim around said access opening and forming a seal between said lid and said rim.

5. The biofilter container of claim 4, said lid being secured to said container by at least one fastener.

6. The biofilter container of claim 1, further comprising a riser extending upward from said top wall and terminating with said access opening.

7. The biofilter container of claim 1, said base having an outside diameter greater than an outside diameter of said top wall.

8. The biofilter container of claim 1, said outlet conduit extending through said at least one side wall at said anti-flotation ring and said anti-flotation ring having a recessed area around said outlet conduit.

9. The biofilter container of claim 1, further comprising at least one horizontal rib extending outward from an exterior side of said at least one side wall.

10. The biofilter container of claim 9, further comprising at least one additional rib extending outward from said exterior side of said at least one side wall and at an angle to said at least one horizontal rib.

11. The biofilter container of claim 1 wherein said inlet conduit includes a spray nozzle therein, said spray nozzle directing wastewater substantially over an upper layer of the body of said filter media.

12. The biofilter container of claim 11 wherein said inlet conduit includes a pressure regulator and a gauge for measuring pressure within said inlet conduit.

13. The biofilter container of claim 1 wherein said inlet conduit and said outlet conduit are pre-plumbed into said container.

14. The biofilter container of claim 1, further comprising a vent in flow communication with said interior space and an external environment, wherein said vent releases noxious gases from said interior space to said external environment and directs fresh air into said interior space from said external environment so that an aerobic environment is maintained within said interior space.

15. The biofilter container of claim 14 wherein said vent further comprises a filter within said vent and positioned between said internal space and said external environment.

16. The biofilter container of claim 15 said filter being a charcoal filter.

17. The biofilter container of claim 1, said filter media being an open cell foam material.

18. The biofilter container of claim 17 wherein said open cell foam material is a polyurethane foam.

19. The biofilter container of claim 1, said filter media being an organic filter media.

20. The biofilter container of claim 19 wherein said organic filter media is selected from the group consisting of peat and coir.

21. The biofilter container of claim 1, said filter media being an inorganic filter media.

22. The biofilter container of claim 21, said inorganic filter media being sand, gravel, or a combination thereof.

23. The biofilter container of claim 1, said body of biofilter media being enveloped by a containment bag.

24. A wastewater treatment system comprising:
   a septic tank having an inlet and an outlet;
   a biofilter container having a base, a top wall having at least one opening therein and at least one side wall joining said base and said top wall, said base, said top wall and said at least one side wall defining an interior space within said container;
   a body of filter media within said interior space;
   said base having an anti-flotation ring extending outward from a peripheral edge of said base;
   said top wall having an access opening therein;
   an inlet conduit in an upper portion of said at least one side wall, said inlet conduit directing wastewater into said container and said inlet conduit having a discharge opening therein positioned downwardly into said container; and
   an outlet conduit in a lower portion of said interior space and extending through said at least one side wall, said outlet conduit having a plurality of openings therein to receive filtered wastewater and discharge from said container.

25. The wastewater treatment system of claim 24, further comprising a lid secured over said access opening.

26. The wastewater treatment system of claim 25, said lid having air flow-through openings to provide air circulation through said interior space.

27. The wastewater treatment system of claim 25, further comprising a gasket seal positioned between said lid and a rim around said access opening and forming a seal between said lid and said rim.

28. The wastewater treatment system of claim 27, said lid being secured to said container by at least one fastener.

29. The wastewater treatment system of claim 24, further comprising a riser extending upward from said top wall and terminating with said access opening.

30. The wastewater treatment system of claim 24, said base having an outside diameter greater than an outside diameter of said top wall.

31. The wastewater treatment system of claim 24, said outlet conduit extending through said at least one side wall at said anti-flotation ring and said anti-flotation ring having a recessed area around said outlet conduit.

32. The wastewater treatment system of claim 24, further comprising at least one horizontal rib extending outward from an exterior side of said at least one side wall.

33. The wastewater treatment system of claim 32, further comprising at least one additional rib extending outward from said exterior side of said at least one side wall and at an angle to said at least one horizontal rib.

34. The wastewater treatment system of claim 24 wherein said inlet conduit includes a spray nozzle therein, said spray nozzle directing wastewater substantially over an upper layer of the body of said filter media.

35. The wastewater treatment system of claim 34 wherein said inlet conduit includes a pressure regulator and a gauge for measuring pressure within said inlet conduit.

36. The wastewater treatment system of claim 24 wherein said inlet conduit and said outlet conduit are pre-plumbed into said container.

37. The wastewater treatment system of claim 24, further comprising a vent in flow communication with said interior space and an external environment, wherein said vent releases noxious gases from said interior space to said external environment and directs fresh air into said interior space from said external environment so that an aerobic environment is maintained within said interior space.

38. The wastewater treatment system of claim 37 wherein said vent further comprises a filter within said vent and positioned between said internal space and said external environment.

39. The wastewater treatment system of claim 38 said filter being a charcoal filter.

40. The wastewater treatment system of claim 24, said filter media being an open cell foam material.

41. The wastewater treatment system of claim 40 wherein said open cell foam material is a polyurethane foam.

42. The wastewater treatment system of claim 24, said filter media being an organic filter media.

43. The wastewater treatment system of claim 42 wherein said organic filter media is selected from the group consisting of peat and coir.

44. The wastewater treatment system of claim 24, said filter media being an inorganic filter media.

45. The wastewater treatment system of claim 44, said inorganic filter media being sand, gravel, or a combination thereof.

46. The wastewater treatment system of claim 24, said body of biofilter media being enveloped by a containment bag.

47. The wastewater treatment system of claim 24, said biofilter container being in flow communication with at least one other biofilter container at said fluid inlet and said fluid outlet.

* * * * *